(12) United States Patent
Tanaka (10) Patent No.: US 11,134,169 B2
(45) Date of Patent: Sep. 28, 2021

(54) INFORMATION PROCESSING DEVICE, INFORMATION MANAGEMENT DEVICE, INFORMATION PROCESSING SYSTEM, AND NON-TRANSITORY COMPUTER READABLE MEDIUM

(71) Applicant: FUJIFILM Business Innovation Corp., Tokyo (JP)

(72) Inventor: Hironori Tanaka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/714,784

(22) Filed: Dec. 15, 2019

(65) Prior Publication Data
US 2020/0366810 A1 Nov. 19, 2020

(30) Foreign Application Priority Data
May 13, 2019 (JP) .............................. JP2019-090903

(51) Int. Cl.
*G06F 15/00* (2006.01)
*H04N 1/34* (2006.01)
(52) U.S. Cl.
CPC ............. *H04N 1/344* (2013.01); *H04N 1/342* (2013.01); *H04N 1/346* (2013.01)
(58) Field of Classification Search
CPC ......... H04N 1/344; H04N 1/346; H04N 1/342

USPC ........................................................ 358/1.15
See application file for complete search history.

(56) References Cited

U.S. PATENT DOCUMENTS

2016/0086144 A1* 3/2016 Kishida ................... G07F 17/26
705/40

FOREIGN PATENT DOCUMENTS

JP 2018-049401 3/2018

* cited by examiner

*Primary Examiner* — Mark R Milia
(74) *Attorney, Agent, or Firm* — JCIPRNET (57) ABSTRACT

An information processing device is provided with a provision unit, a reception unit, and a control unit. The provision unit provides a service. The reception unit receives a billing destination of a fee with respect to a use of the service from among multiple destinations including a first organization that manages the service and a second organization different from the first organization. The control unit forwards, to an external device, a request to use the service including a request for verification of the billing destination received by the reception unit, controls the provision of the service by the provision unit in accordance with a response from the external device regarding the forwarded request, and causes a usage history of the service to be stored in association with the billing destination received by the reception unit.

12 Claims, 8 Drawing Sheets

| LOG ID | DOCUMENT NAME | USER ID | PAGES | UNIT COST | FEE | COMPANY WHERE INSTALLED | COMPANY RESPONSIBLE | DEPARTMENT RESPONSIBLE |
|---|---|---|---|---|---|---|---|---|
| 1 | Print_Service_Functional_Specifications.doc | fx12345 | 10 | 5 YEN | 50 YEN | COMPANY A | COMPANY A | |
| 2 | Print_Service_Specifications.doc | fx12345 | 5 | 5 YEN | 25 YEN | COMPANY A | | |
| 3 | Proposal.doc | fx12345 | 30 | 10 YEN | 300 YEN | COMPANY A | COMPANY B | SALES |
| 4 | Weekend_Plans.ppt | fx12345 | 3 | 30 YEN | 90 YEN | COMPANY A | PRIVATE | |

INFORMATION PROCESSING DEVICE, INFORMATION MANAGEMENT DEVICE, INFORMATION PROCESSING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-090903 filed May 13, 2019.

BACKGROUND

(i) Technical Field

The present disclosure relates to an information processing device, an information management device, an information processing system, and a non-transitory computer readable medium.

(ii) Related Art

Japanese Unexamined Patent Application Publication No. 2018-049401 proposes a multi-function device including: an authentication request unit that executes a process of authenticating a user of the multi-function device; an information acquisition unit that acquires second authentication information for authenticating the user from an IC card in a case where the authentication of the user is determined to be successful by the authentication request unit; a server authentication request unit that requests a private use server for authentication together with the second authentication information acquired by the information acquisition unit; an operation reception unit that receives an operation on the multi-function device in a case of acquiring an authentication result indicating that the authentication of the user is successful from the private use server; an engine control unit that causes the multi-function device to operate on the basis of the operation received by the operation reception unit; and a transmission and reception unit that transmits, to the private use server, information related to operation content by which the engine control unit caused the multi-function device to operate.

SUMMARY

Fees may be totaled separately for business use and private use, but in the case of using a service for business by organizations with different accounting systems, it may be necessary for the user to pay the fees on behalf of the organization and be reimbursed later.

Aspects of non-limiting embodiments of the present disclosure relate to billing fees to organizations appropriately without having the user pay the fees on behalf of the organization and be reimbursed later, even in the case of using a service for business by organizations with different accounting systems.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing device provided with a provision unit, a reception unit, and a control unit. The provision unit provides a service. The reception unit receives a billing destination of a fee with respect to a use of the service from among multiple destinations including a first organization that manages the service and a second organization different from the first organization. The control unit forwards, to an external device, a request to use the service including a request for verification of the billing destination received by the reception unit, controls the provision of the service by the provision unit in accordance with a response from the external device regarding the forwarded request, and causes a usage history of the service to be stored in association with the billing destination received by the reception unit.

BRIEF DESCRIPTION OF THE DRAWINGS

An exemplary embodiment of the present disclosure will be described in detail based on the following figures, wherein.

DETAILED DESCRIPTION

Figure 1:
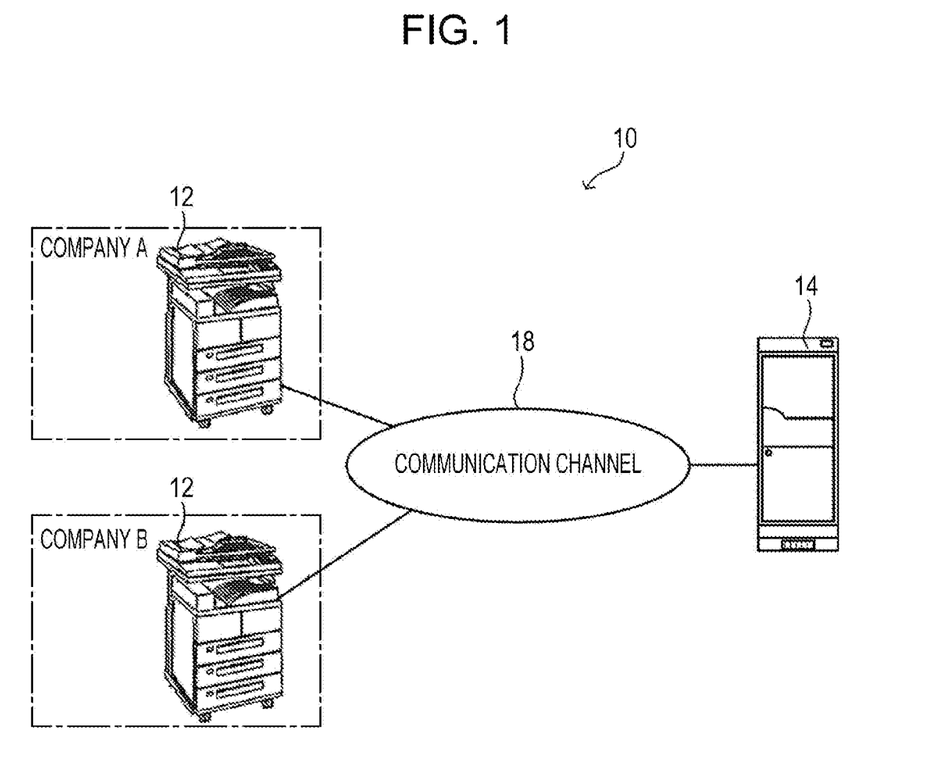
FIG. 1 is a diagram illustrating a schematic configuration of an information processing system including image forming devices according to an exemplary embodiment.

Hereinafter, an exemplary embodiment of the present disclosure will be described in detail and with reference to the drawings. Note that the exemplary embodiment is described by taking as an example the case of applying the information processing device to an image forming device including multiple service functions, such as a facsimile function, an image reading function, an image forming function, a copy function, a storing function of storing image information and the like, and a transmission function of transmitting image information and the like. FIG. 1 is a diagram illustrating a schematic configuration of an information processing system including the image forming device according to the exemplary embodiment.

As illustrated in FIG. 1, an information processing system 10 according to the exemplary embodiment is provided with multiple image forming devices 12 and a server 14 that acts as an information management device.

The image forming devices 12 and the server 14 are connected to each other through a communication channel 18 such as a wide area network (WAN) or the Internet. Additionally, each of the image forming devices 12 and the server 14 is capable of bidirectionally transmitting and receiving various data over the communication channel 18.

Figure 2:
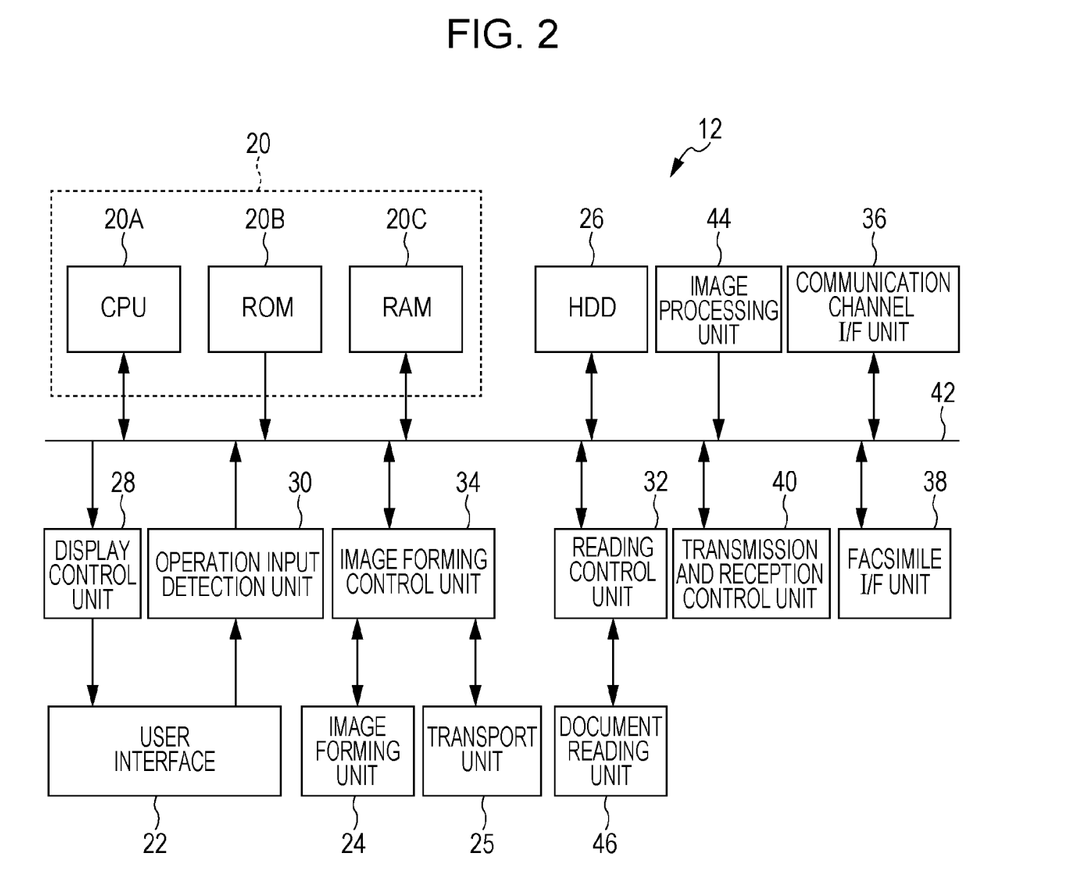
FIG. 2 is a block diagram illustrating a schematic configuration of an electrical system in the image forming device according to the exemplary embodiment.

FIG. 2 is a block diagram illustrating a schematic configuration of an electrical system in one of the image forming devices 12 according to the exemplary embodiment.

As illustrated in FIG. 2, each image forming device 12 according to the exemplary embodiment is provided with a control unit 20 including a central processing unit (CPU) 20A, read-only memory (ROM) 20B, and random access memory (RAM) 20C. The CPU 20A administers the overall operation of the image forming device 12. The RAM 20C is used as a work area or the like when the CPU 20A executes various programs. The ROM 20B stores information such as various control programs and various parameters in advance. Additionally, in the image forming device 12, each component of the control unit 20 is connected electrically by a system bus 42.

Meanwhile, the image forming device 12 according to the exemplary embodiment is provided with a hard disk drive (HDD) 26 that stores various data, application programs, and the like. Also, the image forming device 12 is provided with a display control unit 28 that is connected to a user interface 22 and that controls the display of various operating screens and the like on a display of the user interface 22. Also, the image forming device 12 is provided with an operation input detection unit 30 that is connected to the user interface 22 and that detects operation instructions input through the user interface 22. Additionally, in the image forming device 12, the HDD 26, the display control unit 28, and the operation input detection unit 30 are connected electrically to the system bus 42. Note that in the image forming device 12 according to the exemplary embodiment, an example of providing the HDD 26 is described, but the configuration is not limited thereto, and a non-volatile storage unit such as flash memory may also be provided. The HDD 26 also corresponds to a storage unit.

Also, the image forming device 12 according to the exemplary embodiment is provided with a reading control unit 32 that controls an operation of reading an optical image with a document reading unit 46 and an operation of feeding a document with a document transport unit, and with an image forming control unit 34 that controls an image forming process by an image forming unit 24 and the transport of paper to the image forming unit 24 by a transport unit 25. Also, the image forming device 12 is provided with a communication channel interface (I/F) unit 36 that is connected to the communication channel 18 and that transmits and receives communication data with other external devices such as the server 14 connected to the communication channel 18, and an image processing unit 44 that performs various image processing. Also, the image forming device 12 is provided with a facsimile interface (I/F) unit 38 that is connected to a telephone line not illustrated and that transmits and receives facsimile data with a facsimile device connected to the telephone line. Also, the image forming device 12 is provided with a transmission and reception control unit 40 that controls the transmission and reception of facsimile data through the facsimile I/F unit 38. Also, in the image forming device 12, the transmission and reception control unit 40, the reading control unit 32, the image forming control unit 34, the communication channel I/F unit 36, the facsimile I/F unit 38, and the image processing unit 44 are connected electrically to the system bus 42. Note that the image forming control unit 34 corresponds to a provision unit.

According to the above configuration, in the image forming device 12 according to the exemplary embodiment, access to each of the RAM 20C, the ROM 20B, and the HDD 26 is executed by the CPU 20A. Also, in the image forming device 12, control of the display of operating screens and information such as various messages on a display of the user interface 22 through the display control unit 28 is executed by the CPU 20A. Also, in the image forming device 12, control of the workings of the document reading unit 46 and the document transport unit through the reading control unit 32 is executed by the CPU 20A. Also, in the image forming device 12, control of the workings of the image forming unit 24 and the transport unit 25 through the image forming control unit 34 and control of the transmission and reception of communication data through the communication channel I/F unit 36 are executed by the CPU 20A. Also, in the image forming device 12, control of the transmission and reception of facsimile data through the facsimile I/F unit 38 by the transmission and reception control unit 40 is executed by the CPU 20A. Furthermore, in the image forming device 12, the CPU 20A ascertains operation content in the user interface 22 based on operation information detected by the operation input detection unit 30, and executes various types of control based on the operation content.

Note that the user interface 22 includes an authentication information reading unit such as a card reader for acquiring authentication information for using the various functions of the image forming device 12, and user authentication is performed on the basis of information read by the authentication information reading unit. Also, the user interface 22 corresponds to an input unit and an acquisition unit.

Figure 3:
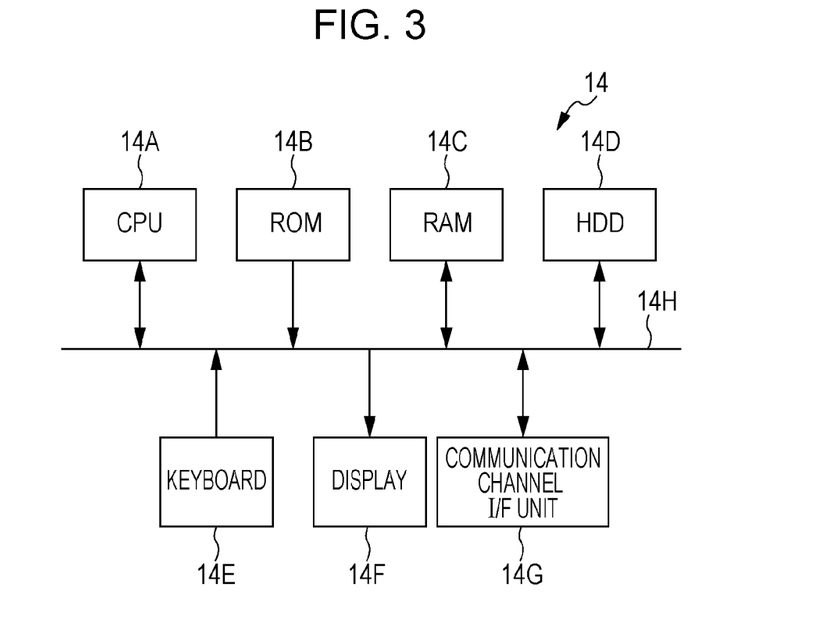
FIG. 3 is a block diagram illustrating a schematic configuration of an electrical system in a server according to the exemplary embodiment.

Next, a schematic configuration of an electrical system in the server 14 according to the exemplary embodiment will be described. FIG. 3 is a block diagram illustrating a schematic configuration of an electrical system in the server 14 according to the exemplary embodiment.

As illustrated in FIG. 3, the server 14 according to the exemplary embodiment is provided with a CPU 14A, ROM 14B, RAM 14C, an HDD 14D that acts as an association storage unit, a keyboard 14E, a display 14F, and a communication channel interface (I/F) unit 14G. The CPU 14A administers the overall operation of the server 14. The ROM 14B stores information such as various control programs and various parameters in advance. The RAM 14C is used as a work area or the like when the CPU 14A executes various programs. The HDD 14D stores various data, application programs, and the like. Note that in the server 14, the HDD 14D functions as storage 16D that stores information. The keyboard 14E is used to input various information. The display 14F is used to display various information. The communication channel interface (I/F) unit 14G is connected to the communication channel 18, and transmits and receives various data with other devices connected to the communication channel 18. The above components of the server 14 are electrically interconnected by a system bus 14H. Note that in the server 14 according to the exemplary embodiment, an example of providing the HDD 14D is described, but the configuration is not limited thereto, and another non-volatile storage unit such as flash memory may also be provided.

According to the above configuration, in the server 14 according to the exemplary embodiment, access to the ROM 14B, the RAM 14C, and the HDD 14D, the acquisition of various data through the keyboard 14E, and the display of various information on the display 14F are executed by the CPU 14A. Also, in the server 14, control of the transmission and reception of communication data through the communication channel I/F unit 14G is executed by the CPU 14A.

In the information processing system 10 according to the exemplary embodiment configured in this way, the server 14 provides various services, such as a cloud service and a totaling service that totals fees for the use of the image forming devices 12. In the following, a case in which the server 14 provides a totaling service that totals fees for image forming performed by users using the image forming devices 12 will be described as an example.

Figure 4:
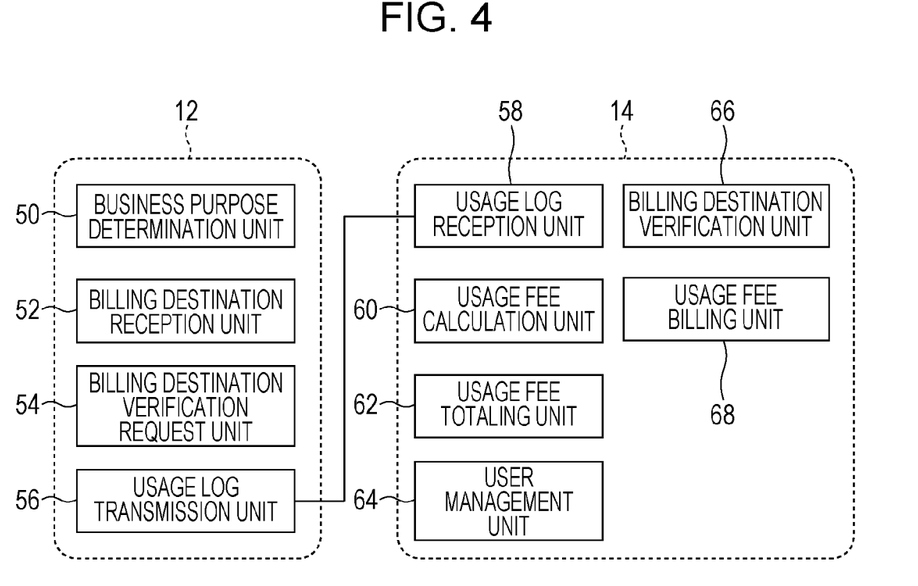
FIG. 4 is a functional block diagram of the image forming device and the server in the information processing system according to the exemplary embodiment.

A functional configuration of each of the image forming devices 12 and the server 14 in the information processing system 10 according to the exemplary embodiment configured as above will be described. FIG. 4 is a functional block diagram of one of the image forming devices 12 and the server 14 in the information processing system 10 according to the exemplary embodiment.

The image forming device 12 includes the functions of a business purpose determination unit 50, a billing destination reception unit 52 that acts as a reception unit, a billing destination verification request unit 54 that acts as a request unit, and a usage log transmission unit 56.

The business purpose determination unit 50 determines whether or not a purpose of use of the image forming device 12 is for business by a company that manages the image forming device 12. The determination is made on the basis of a reception result from the billing destination reception unit 52.

The billing destination reception unit 52 receives a designation of a billing destination of a fee for the use of the image forming device 12. The method of receiving the billing destination may include determining the billing destination from a document name of document information that is the target of image forming, for example. Alternatively, a billing destination input by a driver for setting information such as image forming parameters when performing image forming may be received. Alternatively, a billing destination input using the user interface 22 or the like when giving an instruction for image forming may be received. Alternatively, a card ID stored in a card that authenticates the user may be associated with a billing destination in advance, and the billing destination may be received by reading the card ID. Alternatively, a billing destination may be received on the basis of the attributes of a print job (such as the job name and the user ID, for example).

The billing destination verification request unit 54 issues a verification request for verifying the billing destination received by the billing destination reception unit 52 to the server 14. Specifically, by transmitting the user ID and information about the billing destination to the server 14, verification of the billing destination designated by the user is requested, and a request result is received from the server 14.

Figure 5:
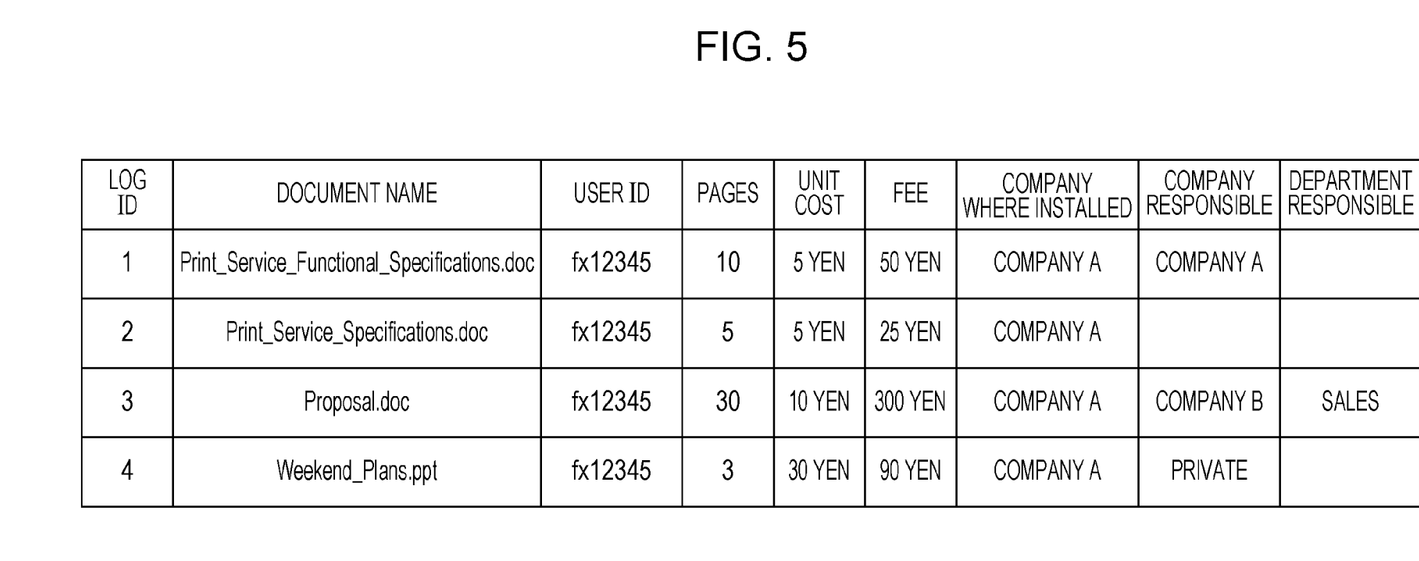
FIG. 5 is a diagram illustrating one example of a usage log.

The usage log transmission unit 56 transmits a usage history associating information such as an image forming result, the billing destination, a service type (such as image forming, for example), and a fee to the server 14 as a usage log. One example of a usage log is illustrated in FIG. 5.

On the other hand, the server 14 is provided with the functions of a usage log reception unit 58, a usage fee calculation unit 60, a usage fee totaling unit 62 that acts as a totaling unit, a user management unit 64, a billing destination verification unit 66 that acts as a reception unit and a transmission unit, and a usage fee billing unit 68.

The usage log reception unit 58 receives a usage log transmitted from the usage log transmission unit 56 of the image forming device 12. The received usage log is stored in the HDD 14D or the like.

The usage fee calculation unit 60 calculates a fee for the use of the image forming device 12, on the basis of the usage log received by the usage log reception unit 58. The calculation result is stored in the HDD 14D or the like as the usage log. The fields illustrated in FIG. 5 are stored in the usage log, for example. In the example of FIG. 5, information such as a log ID, a document name, a user ID, a number of pages, a unit cost, a fee, a company where the image forming device 12 is installed, a company that is responsible for paying fees, and a department that is responsible for paying fees are stored in the HDD 14D as the usage log.

The usage fee totaling unit 62 uses the usage log stored in the HDD 14D or the like to total up a usage fee for each organization, such as each company.

The user management unit 64 stores associations between the multiple image forming devices 12 and the organization that manages each of the multiple image forming devices 12 in the HDD 14D or the like, and also manages users by storing associations between each user and the organization, such as a company, with which each user is contracted in the HDD 14D or the like.

In the case where a billing destination verification is requested by the billing destination verification request unit 54, the billing destination verification unit 66 verifies whether or not an organization such as a company of a billing destination corresponding to user information managed by the user management unit 64 exists, on the basis of the user ID and the billing destination received from the image forming device 12. Subsequently, a verification result is transmitted in a reply to the image forming device 12 from which the request originated.

The usage fee billing unit 68 uses a result of totaling by the usage fee totaling unit 62 to bill a usage fee to each billing destination. For example, a usage fee is billed by transmitting a result of totaling image usage fees to an accounting system or the like used by the company of the billing destination.

Next, specific processes performed by each of the image forming devices 12 and the server 14 in the information processing system 10 according to the exemplary embodiment configured as above will be described.

Figure 6:
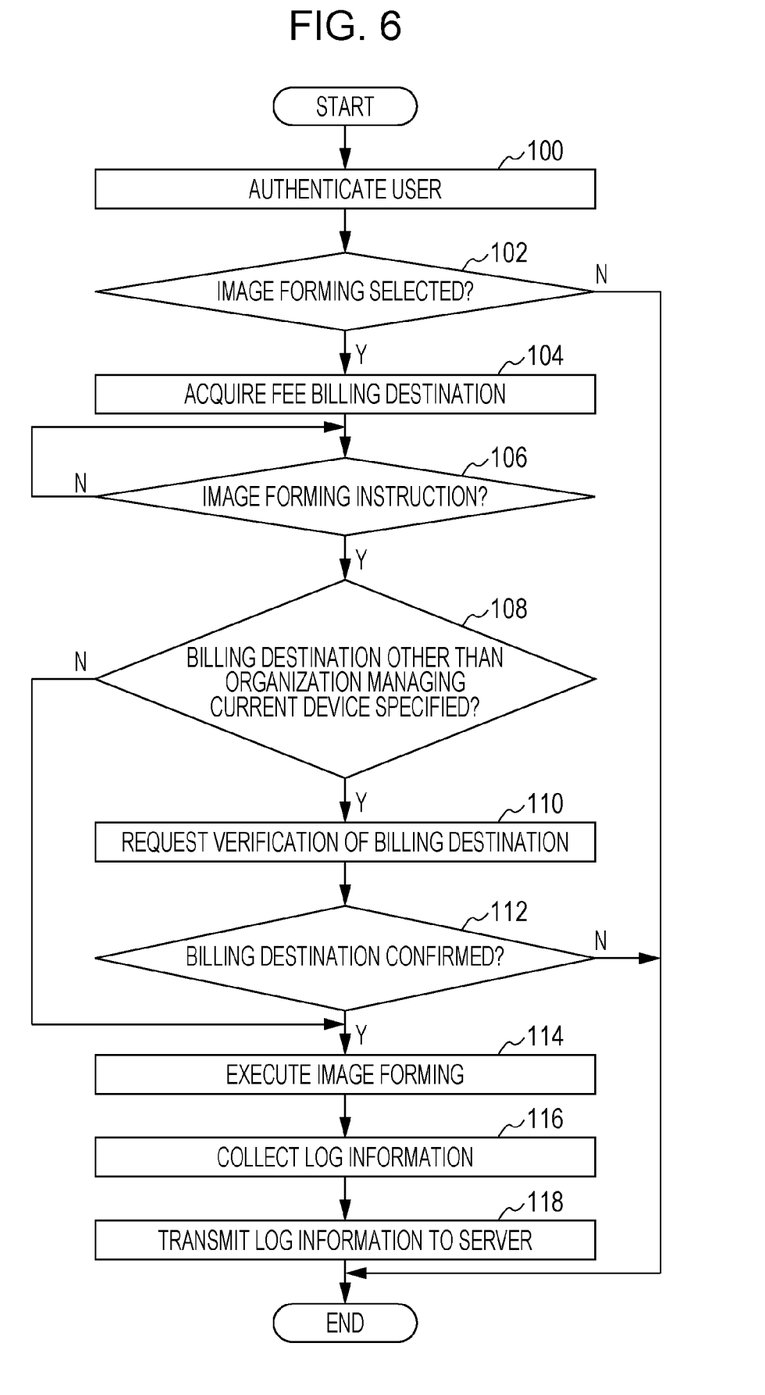
FIG. 6 is a flowchart illustrating one example of a flow of processes performed by a control unit of the image forming device according to the exemplary embodiment.

First, specific processes performed when one of the image forming devices 12 performs image forming will be described. FIG. 6 is a flowchart illustrating one example of a flow of processes performed by the control unit 20 of the image forming device 12 according to the exemplary embodiment. Note that the processes in FIG. 6 illustrate the case in which a user uses the image forming function of the image forming device 12 as an example.

In step 100, the CPU 20A performs user authentication and proceeds to step 102. For example, user authentication is performed according to authentication information read by the authentication information reading unit or the like included in the user interface 22. Specifically, user authentication is performed by reading user information stored in a card with a card reader or the like. Note that in cases where authentication is unsuccessful, the process ends directly.

In step 102, the CPU 20A determines whether or not the user interface 22 has been operated to select image forming. In the case of a positive determination, the process proceeds to step 104. In the case where an operation other than image forming has been performed and the determination is negative, the series of processes ends.

In step 104, the CPU 20A acquires a billing destination and proceeds to step 106. For example, the billing destination is acquired on the basis of the determination result from the business purpose determination unit 50 and the reception result from the billing destination reception unit 52. As an example, the billing destination may be detected and acquired from the document name or document content of the information that is the target of image forming. Also, in the case where the billing destination is input by a driver for setting information such as image forming parameters when performing image forming, the billing destination may be acquired from the driver. Also, in the case where the billing destination is input using the user interface 22 or the like when giving an instruction for image forming, the billing destination input by the user interface 22 may be acquired. Also, in the case where a card ID stored in a card that authenticates the user is associated with a billing destination in advance and the billing destination is received by reading the card ID, the billing destination associated with the card ID may be acquired. Note that in the case where the billing destination is acquired from the information that is the target of image forming, if a billing destination is not detected successfully, a predetermined billing destination may be acquired. For example, the company that manages the image forming device 12 or the user personally may be treated as the predetermined billing destination. Alternatively, another organization may be treated as the predetermined billing destination.

In step 106, the CPU 20A determines whether or not an image forming instruction has been given. The determination is made by determining whether or not an image forming instruction has been given through the user interface 22, a printer driver, or the like. In the case where the determination is negative, the flow stands by until a positive determination is made, and then proceeds to step 108. Note that in the case where an instruction to execute another process is given while the flow is standing by, the series of processes is ended, and the process is executed according to the instruction.

In step 108, the CPU 20A determines whether or not an organization different from the organization managing the image forming device 12 has been designated as the billing destination. If the determination is positive, the process proceeds to step 110, whereas if negative, the process proceeds to step 114. Note that a configuration omitting step 108 is also possible.

In step 110, the CPU 20A issues a billing destination verification request to the server 14, and proceeds to step 112. In other words, verification of the billing destination is requested by having the billing destination verification request unit 54 transmit the user ID and information about the billing destination to the server 14.

In step 112, the CPU 20A determines whether or not the billing destination has been confirmed. The determination is made by determining whether or not a response to the verification request by the billing destination verification request unit 54 has been received and the billing destination has been confirmed. In the case of a positive determination, the process proceeds to step 114. In the case where the billing destination is not confirmed and the determination is negative, the series of processes ends.

In step 114, the CPU 20A executes image forming and proceeds to step 116. In other words, the CPU 20A controls the workings of the image forming unit 24 and the transport unit 25 through the image forming control unit 34, thereby causing an image to be formed on a sheet of paper.

In step 116, the CPU 20A collects log information and proceeds to step 118. In other words, the usage log transmission unit 56 collects a usage history including information such as an image forming result, the billing destination, a service type (such as image forming, for example), and a fee as a usage log, and stores the usage log in the HDD 26 or the like.

In step 118, the CPU 20A transmits log information to the server 14 and ends the series of processes. In other words, the usage log transmission unit 56 transmits the collected usage log to the server 14.

Figure 7:
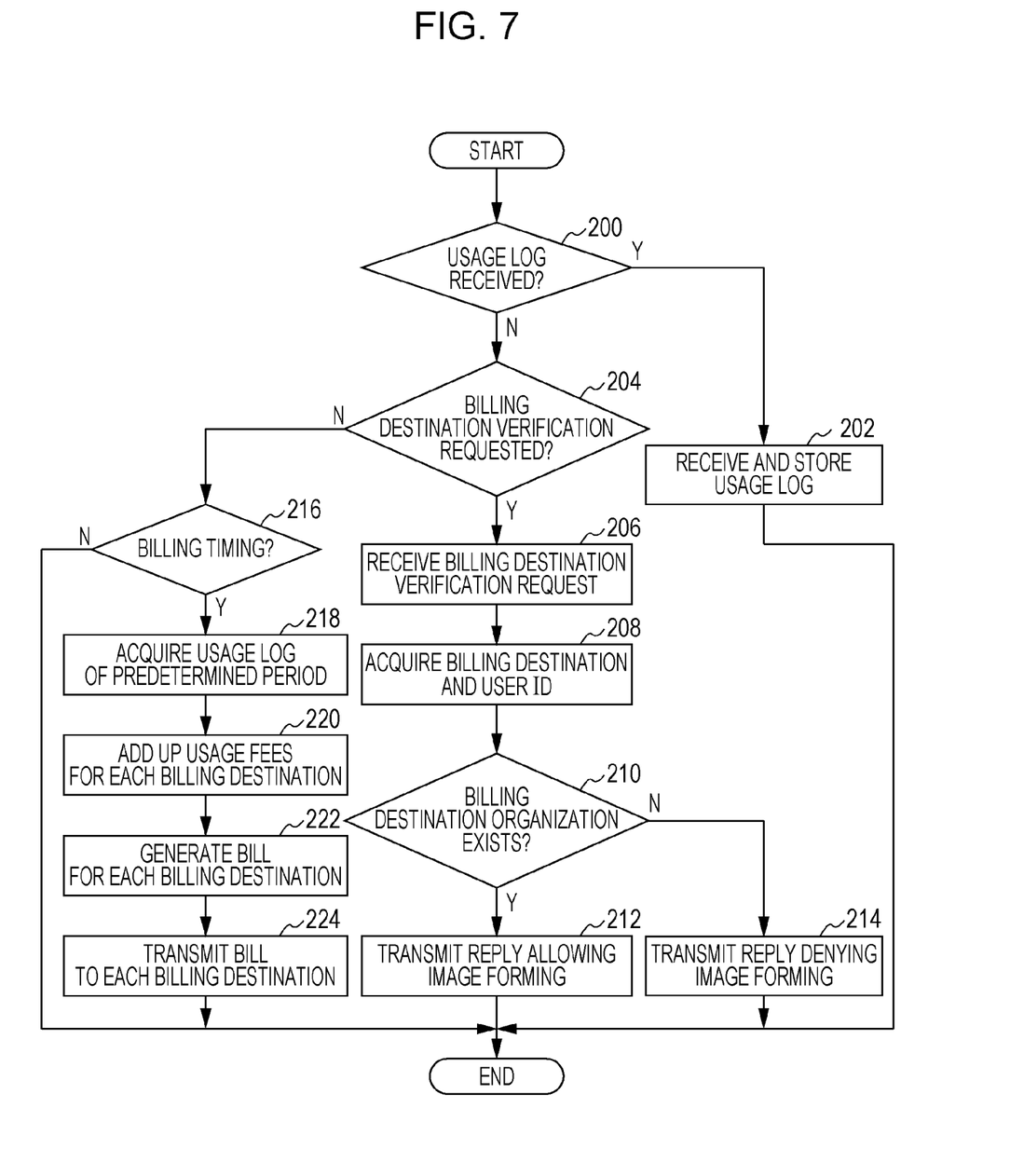
FIG. 7 is a flowchart illustrating an example of a flow of processes performed by the server according to the exemplary embodiment.

Next, specific processes performed by the server 14 will be described. FIG. 7 is a flowchart illustrating an example of a flow of processes performed by the server 14 according to the exemplary embodiment. Note that the processes in FIG. 7 are started in the case where a usage log is transmitted from one of the image forming devices 12, the case where verification of a billing destination is requested, or the case where a predetermined billing timing is reached.

In step 200, the CPU 14A determines whether or not a usage log has been received from one of the image forming devices 12. The determination is made by determining whether or not the usage log reception unit 58 has received a usage log transmitted by the usage log transmission unit 56. If the determination is positive, the process proceeds to step 202, whereas if negative, the process proceeds to step 204.

In step 204, the CPU 14A determines whether or not verification of a billing destination has been requested by the billing destination verification request unit 54. If the determination is positive, the process proceeds to step 206, whereas if negative, the process proceeds to step 216.

In step 206, the CPU 14A receives the billing destination verification request and proceeds to step 208. In other words, the billing destination verification unit 66 receives the billing destination verification request from the billing destination verification request unit 54.

In step 208, the CPU 14A acquires the billing destination and the user ID, and proceeds to step 210. In other words, the billing destination verification unit 66 acquires the user ID and the billing destination transmitted from the billing destination verification request unit 54 when the billing destination verification request was issued.

In step 210, the CPU 14A determines whether or not the organization designated as the billing destination exists. For example, the user management unit 64 determines whether or not the acquired billing destination exists. More specifically, the user management unit 64 determines whether or not the user corresponding to the acquired user ID is stored in the HDD 14D in association with the organization designated as the billing destination. If the determination is positive, the process proceeds to step 212, whereas if negative, the process proceeds to step 214. Note that the user management unit 64 may also communicate with an authentication server of the organization designated as the billing destination to confirm whether or not the user exists. Alternatively, the user management unit 64 may request user authentication from an authentication server of the organization designated as the billing destination, and acquire an authentication result.

In step 212, the CPU 14A transmits a reply allowing image forming to the origin of the billing destination verification request, and ends the series of processes. In other words, the billing destination verification unit 66 transmits a reply allowing image forming as a verification result to the billing destination verification request unit 54. With this arrangement, the determination in step 110 described above is positive.

In step 214, the CPU 14A transmits a reply denying image forming to the origin of the billing destination verification request, and ends the series of processes. In other words, the billing destination verification unit 66 transmits a reply denying image forming as a verification result to the billing destination verification request unit 54. With this arrangement, the determination in step 110 described above is negative. Note that in the exemplary embodiment, in the case where the billing destination is not confirmed, a reply denying image forming is transmitted to the image forming device 12 from which the verification request originated and image forming is prohibited, but the configuration is not limited thereto. For example, in the case where the billing destination is not confirmed, a reply indicating the unsuccessful confirmation may be transmitted to the image forming device 12, the billing destination may be changed to the user him- or herself, and image forming may be allowed.

On the other hand, in step 216, the CPU 14A determines whether or not a predetermined billing timing has been reached. For example, it is determined whether or not a predetermined billing day has been reached. If the determination is positive, the process proceeds to step 218, whereas if negative, the series of processes ends and another process is performed.

In step 218, the CPU 14A acquires a usage log of a predetermined period from the HDD 14D or the like, and proceeds to step 220.

In step 220, the CPU 14A adds up the usage fees for each billing destination, and proceeds to step 222. In other words, the usage fee calculation unit 60 calculates the usage fees from the usage log, while in addition, the usage fee totaling unit 62 totals the usage fees for each billing destination. The totaled usage fees become a usage log with a verified association of the billing destination with the user. Also, in the case where the organization, such as a company, designated as the billing destination is different from the organization that manages the device itself, the usage log is totaled as a history to be billed to the designated organization.

In step 222, the CPU 14A generates a bill for each billing destination, and proceeds to step 224. For example, the usage fee totaling unit 62 generates a bill for each billing destination on the basis of the totaled results.

In step 224, the CPU 14A transmits the bill to each billing destination, and ends the series of processes. For example, the usage fee billing unit 68 transmits a generated bill to an accounting system, email address, or the like of the billing destination stored in advance.

Figure 8:
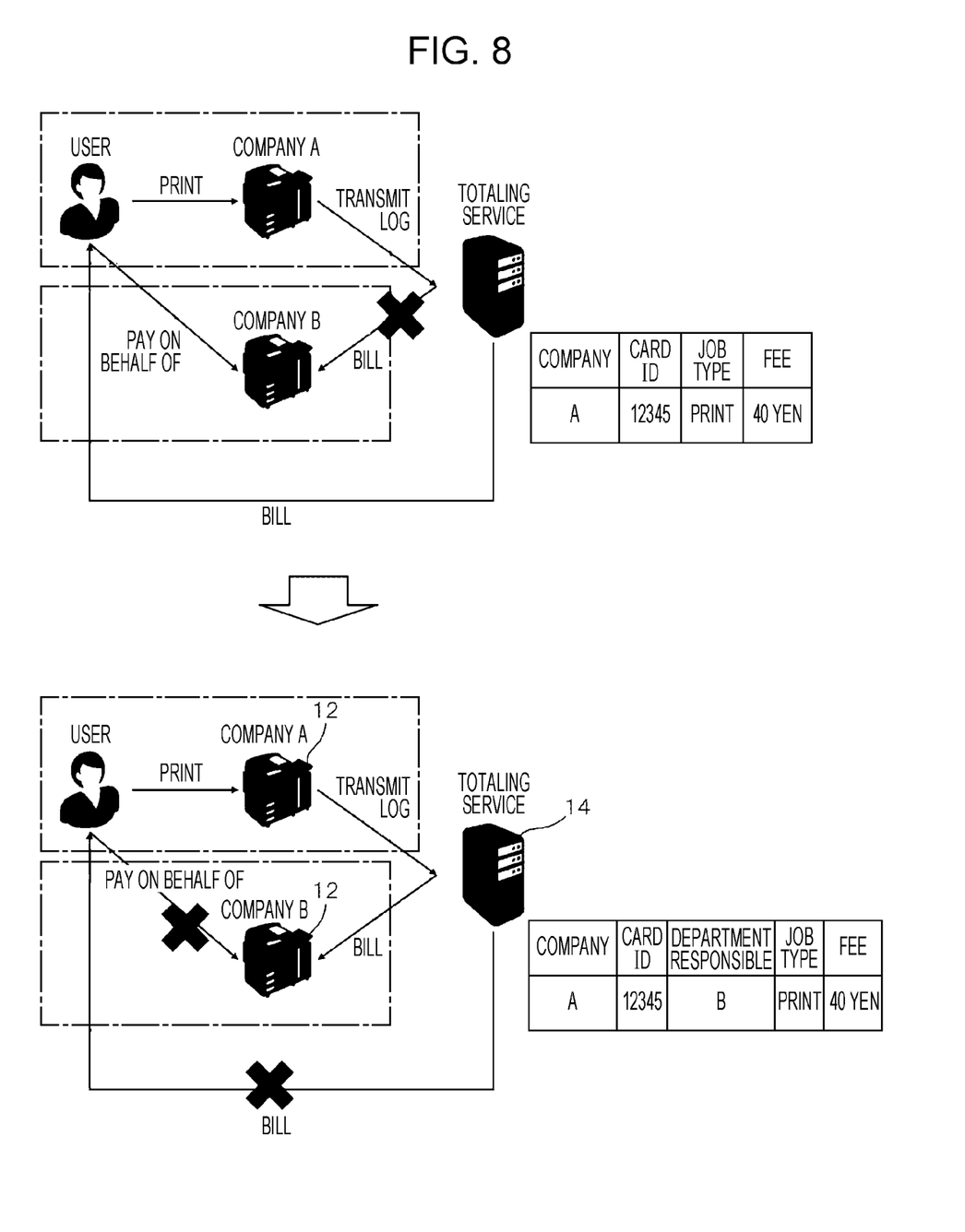
FIG. 8 is a diagram illustrating how fees are billed according to the related art and how fees are billed according to the exemplary embodiment in a case where a user uses an image forming device managed by a company A for business by a company B.

By performing processes in this way, as illustrated in FIG. 8, in the case where a user uses one of the image forming devices 12 managed by the company A for business by the company B, the server 14 bills the company B designated as the billing destination directly, without having a totaling service bill the user and having the user be reimbursed later like in the past.

Note that although the foregoing exemplary embodiment describes an example in which fees for image forming by the image forming devices 12 are treated as the fees with respect to a service, the configuration is not limited thereto. For example, usage fees may also be applied to various types of cloud services, such as translation services and optical character recognition (OCR) services.

Also, the processes performed by each unit of the information processing system 10 according to the foregoing exemplary embodiment may be taken to be processes performed by software, processes performed by hardware, or processes performed by a combination of the two. Also, the processes performed by each unit of the information processing system 10 may be distributed by being stored on a storage medium as a program.

In addition, the present disclosure is not limited to the foregoing, and obviously various modifications other than the above may be carried out within a scope that does not depart from the gist of the present disclosure.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing device comprising:
a processor, configured to:
provide a service;
receive a billing destination of a fee with respect to a use of the service from among a plurality of destinations including a first organization that manages the service and a second organization that does not manage the service and is different from the first organization;
determine whether an organization different from the first organization managing the service has been designated as the billing destination;
in response to the second organization being designated as the billing destination, forward, to an external device, a request to use the service including a request for verification of the billing destination control the provision of the service in accordance with a response from the external device regarding the forwarded request, cause a usage history of the service to be stored in association with the billing destination, and provide the service managed by the first organization to a user in the second organization in a case of receiving a response indicating that the second organization is confirmed in response to the verification request; and
in response to the first organization being designated as the billing destination, provide the service to a user in the first organization.

2. The information processing device according to claim 1, wherein
the processor receives a billing destination detected from target information that is a target of the service.

3. The information processing device according to claim 2, wherein
in a case where the billing destination is not successfully detected from the target information, the processor receives a predetermined billing destination.

4. The information processing device according to claim 1 further comprising:
an input device that inputs the billing destination when the service is provided, and the processor receives the billing destination input by the input device.

5. The information processing device according to claim 1, wherein
the processor further acquires predetermined identification information and receives the billing destination predetermined in association with the identification information.

6. An information processing device comprising:
a memory that stores a usage history of a service; and
a processor, configured to:
provide the service;
receive a specification of a billing destination of a fee with respect to a use of the service from among a plurality of destinations including a first organization that manages the service and a second organization that does not manage the service and is different from the first organization;
in a case where the billing destination is the second organization forward, to an external device, a request to use the service including a request for verification of the billing destination control the provision of the service in accordance with a response from the external device regarding the forwarded request, cause a usage history of the service to be stored in the memory in association with the second organization, and provide the service managed by the first organization to a user in the second organization in accordance with a response indicating that the second organization is confirmed from the external device in response to the verification request; and
in a case where the billing destination is the first organization, provide the service to a user in the first organization and cause a usage history of the service to be stored in the memory in association with the first organization.

7. An information management device comprising:
a memory that stores associations between a plurality of information processing devices that provide a service and organizations that manage the plurality of information processing devices;
a processor that receives, from one of the plurality of information processing devices, a notification indicating that a request to use a service has been received, the use of the service being billed to a billing destination, the billing destination being a second organization that does not manage the service and is different from a first organization that manages the information processing device; and
a communication channel interface that transmits a result of confirming whether or not the second organization is stored in the memory to the information processing device from which the notification is received, wherein a user in the second organization is provided the service by the information processing device from which the notification is received in a case of the result of the second organization is confirmed,
wherein the processor receives usage histories of the service from the information processing devices and totals the usage histories as a history to be billed to the second organization.

8. The information management device according to claim 7,
wherein the processor further uses a result of the totaling to bill a fee for the use of the service to each billing destination.

9. An information processing system comprising:
the information processing device according to claim 1; and
the information management device according to claim 7.

10. An information processing system comprising:
the information processing device according to claim 1; and
the information management device according to claim 8.

11. A non-transitory computer readable medium storing a program causing a computer to execute a process for processing information, the process comprising:
providing a service;
receiving a billing destination of a fee with respect to a use of the service from among a plurality of destinations including a first organization that manages the service and a second organization that does not manage the service and is different from the first organization;
determining whether an organization different from the first organization managing the service has been designated as the billing destination;
in response to the second organization being designated as the billing destination, forwarding, to an external device, a request to use the service including a request for verification of the received billing destination, controlling the provision of the service in accordance with a response from the external device regarding the forwarded request, causing a usage history of the service to be stored in association with the received billing destination, and providing the service managed by the first organization to a user in the second organization in a case of receiving a response indicating that the second organization is confirmed in response to the verification request; and
in response to the first organization being designated as the billing destination, providing the service to a user in the first organization.

12. A non-transitory computer readable medium storing a program causing a computer to execute a process for processing information, the process comprising:
storing associations between a plurality of information processing devices that provide a service and organizations that manage the plurality of information processing devices;
receiving, from one of the plurality of information processing devices, a notification indicating that a request to use a service has been received, the use of the service being billed to a billing destination, the billing destination being a second organization that does not manage the service and is different from a first organization that manages the information processing device;
transmitting a result of confirming whether or not the second organization is stored to the information processing device from which the notification is received, wherein a user in the second organization is provided the service by the information processing device from which the notification is received in a case of the result of the second organization is confirmed; and
receiving usage histories of the service from the information processing devices and totaling the usage histories as a history to be billed to the second organization.

* * * * *